(12) United States Patent
Chang et al.

(10) Patent No.: US 10,557,771 B2
(45) Date of Patent: Feb. 11, 2020

(54) TEST CYLINDER OF VALVE ASSEMBLY AND CONNECTION STRUCTURE FOR THE SAME

(71) Applicant: Globe Union Industrial Corp., Taichung (TW)

(72) Inventors: Tachun Chang, Taichung (TW); Yueping Xiao, Shen Zen (CN); Kaizhong He, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 36 days.

(21) Appl. No.: 16/021,342

(22) Filed: Jun. 28, 2018

(65) Prior Publication Data

US 2019/0242776 A1    Aug. 8, 2019

(30) Foreign Application Priority Data

Feb. 8, 2018 (CN) .................... 2018 2 0229183 U

(51) Int. Cl.
| | |
|---|---|
| G01M 3/28 | (2006.01) |
| G05D 23/13 | (2006.01) |
| E03C 1/04 | (2006.01) |
| F16K 11/00 | (2006.01) |

(52) U.S. Cl.
CPC ........ *G01M 3/2876* (2013.01); *G01M 3/2815* (2013.01); *G05D 23/1306* (2013.01); *E03C 1/04* (2013.01); *E03C 2201/30* (2013.01); *F16K 19/006* (2013.01); *Y10T 137/5196* (2015.04)

(58) Field of Classification Search
CPC ............ Y10T 137/5196; F16K 19/006; G05D 23/1306; G01M 3/2876; G01M 3/2815
See application file for complete search history.

(56) References Cited

U.S. PATENT DOCUMENTS

| | | | | |
|---|---|---|---|---|
| 4,901,749 A | * | 2/1990 | Hutto | F16K 19/006 137/270 |
| 9,874,287 B2 | * | 1/2018 | Brouwer et al. | F16K 39/024 |
| 2018/0259082 A1 | * | 9/2018 | Ye et al. | F16K 19/006 |

* cited by examiner

*Primary Examiner* — Kevin L Lee
(74) *Attorney, Agent, or Firm* — Alan D. Kamrath; Mayer & Williams PC

(57) ABSTRACT

A test cylinder of a valve assembly is mounted a body of the valve assembly, the body includes a holder containing an accommodation chamber, a bottom fence formed, and a cold-water inlet and a hot-water inlet which respectively communicate with a cold-water inflow pipe and a hot-water inflow pipe of the body. The accommodation chamber has a first mixing-water outlet and a second mixing-water outlet which individually communicate with a first outflow pipe and a second outflow pipe. The test cylinder includes a peripheral fence, a first orifice, an edge fence, and a first cavity defined. The peripheral fence has at least one second orifice, a second cavity, and an internal surround portion of the accommodation chamber. The edge fence has a closing portion extending from an outer wall thereof and has a conduit defined in the edge fence.

10 Claims, 8 Drawing Sheets

TEST CYLINDER OF VALVE ASSEMBLY AND CONNECTION STRUCTURE FOR THE SAME

FIELD OF THE INVENTION

The present invention relates to a temperature control valve or a thermostatic valve of bathroom equipment, and more particularly to a test cylinder of a valve assembly and a connection structure for the same which are applied to execute a pressure test.

BACKGROUND OF THE INVENTION

A temperature control valve or a thermostatic valve assembly of bathroom equipment is employed to adjust or set a temperature of a water supply. A conventional valve assembly is mounted on a wall of a bathroom and contains a body on which a holder is formed. The holder includes an accommodation chamber configured to accommodate a mixing valve covered by a decoration cover, and the holder includes a control bar for controlling the mixing valve. The holder includes a cold-water inflow connector horizontally extending from a first side thereof, a hot-water inflow connector horizontally extending from a second side of the holder opposite to the cold-water inflow connector, a first outflow connector, and a second outflow connector. Thereby, after cold water from the cold-water inflow connector and hot water from the hot-water inflow connector flow into the holder, they are controlled by the control bar so as to adjust flow and mixing rate of mixing water of the cold water and the hot water in the mixing valve, and the mixing water is controlled to flow toward the first outflow connector and the second outflow connector at a predetermined flow and a set temperature. Furthermore, the mixing valve mates with a pressure balance valve so as to obtain a constant temperature.

The first outflow connector is in connection to a shower via an upper water tube, and the second outflow connector is coupled to a faucet via a lower water tube. The cold-water inflow connector has a first fixer configured to house a first stop set, and the hot-water inflow connector has a second fixer configured to house a second stop set, such that the cold water and the hot water respectively flowing through the cold-water inflow connector and the hot-water inflow connector are controlled to flow or stop flowing in maintenance.

In construction of a building, a cold-water inflow pipe, a hot-water inflow pipe, and the mixing-water outflow pipe are housed in a basic wall, such as a wooden wall, so as to test water leakage. Thereafter, tiles or other decoration materials are adhered on the basic wall. To avoid damage the valve assembly, a protective cover is connected with the body so as to protect the accommodation chamber.

A conventional protective cover is screwed on the holder of a body and is removed before testing the water leakage. For example, a test lid is housed in the accommodation chamber so as to test air pressure or water pressure, thus confirming whether the water leakage occurs.

The test lid is fixed on the holder of the body so as to close the accommodation chamber, and the cold-water inflow pipe, the hot-water inflow pipe, two outflow pipes and the valve assembly communicate with one another, and a pipe system is closed. When a water pressure declines after executing a pressure test, it represents the water leakage occurs in the pipe system.

However, the cold-water inflow pipe or the hot-water inflow pipe cannot be tested solely, so a position of the water leakage in the pipe system cannot be confirmed exactly.

The present invention has arisen to mitigate and/or obviate the afore-described disadvantages.

SUMMARY OF THE INVENTION

The primary aspect of the present invention is to provide a test cylinder of a valve assembly and a connection structure for the same which are applied to execute a pressure test so as to confirm a position of a water leakage exactly.

To obtain the above aspects, a test cylinder of a valve assembly provided by the present invention is mounted a body of the valve assembly.

The body includes a holder, and the holder contains an accommodation chamber, a bottom fence formed in the accommodation chamber, and a cold-water inlet and a hot-water inlet which are defined on the bottom fence and respectively communicate with a cold-water inflow pipe and a hot-water inflow pipe of the body. The accommodation chamber has a first mixing-water outlet and a second mixing-water outlet which are arranged on a bottom of the accommodation chamber and individually communicate with a first outflow pipe and a second outflow pipe.

The test cylinder includes a peripheral fence, a first orifice formed on a first segment of the peripheral fence, and an edge fence closing a second segment of the peripheral fence. A first cavity is defined between the peripheral fence and the edge fence and communicating with the first orifice.

The peripheral fence has at least one second orifice formed thereon proximate to the first orifice, a second cavity defined between an external surround portion of the first segment and an internal surround portion of the accommodation chamber and communicating with the at least one second orifice, the first mixing-water outlet, and the second mixing-water outlet.

In a first fixing direction, the first segment of the test cylinder is engaged in the accommodation chamber, such that the accommodation chamber is closed, the cold-water inlet and the hot-water inlet communicate with each other by way of the first orifice and the first cavity, and the first mixing-water outlet and the second mixing-water outlet are in communication with each other by using the at least one second orifice and the second cavity so that the cold-water inflow pipe, the hot-water inflow pipe, the first outflow pipe, and the second outflow pipe form a first closed pipe system. The edge fence has a closing portion extending from an outer wall thereof and has a conduit defined in the edge fence.

In a second fixing direction, the second segment of the test cylinder is engaged in the accommodation chamber or the closing portion matingly engages one of the cold-water inlet and the hot-water inlet, hence the cold-water inlet or the hot-water inlet does not communicate with the accommodation chamber of the body so that one of the cold-water inflow pipe and the hot-water inflow pipe forms a second closed pipe system.

The other of the cold-water inlet and the hot-water inlet communicates with the first mixing-water outlet and the second mixing-water outlet by way of the conduit and the second cavity so that the other of the cold-water inflow pipe and the hot-water inflow pipe forms a third closed pipe system by using the body, the first outflow pipe, and the second outflow pipe.

DETAILED DESCRIPTION OF THE PREFERRED EMBODIMENTS

Figure 1:
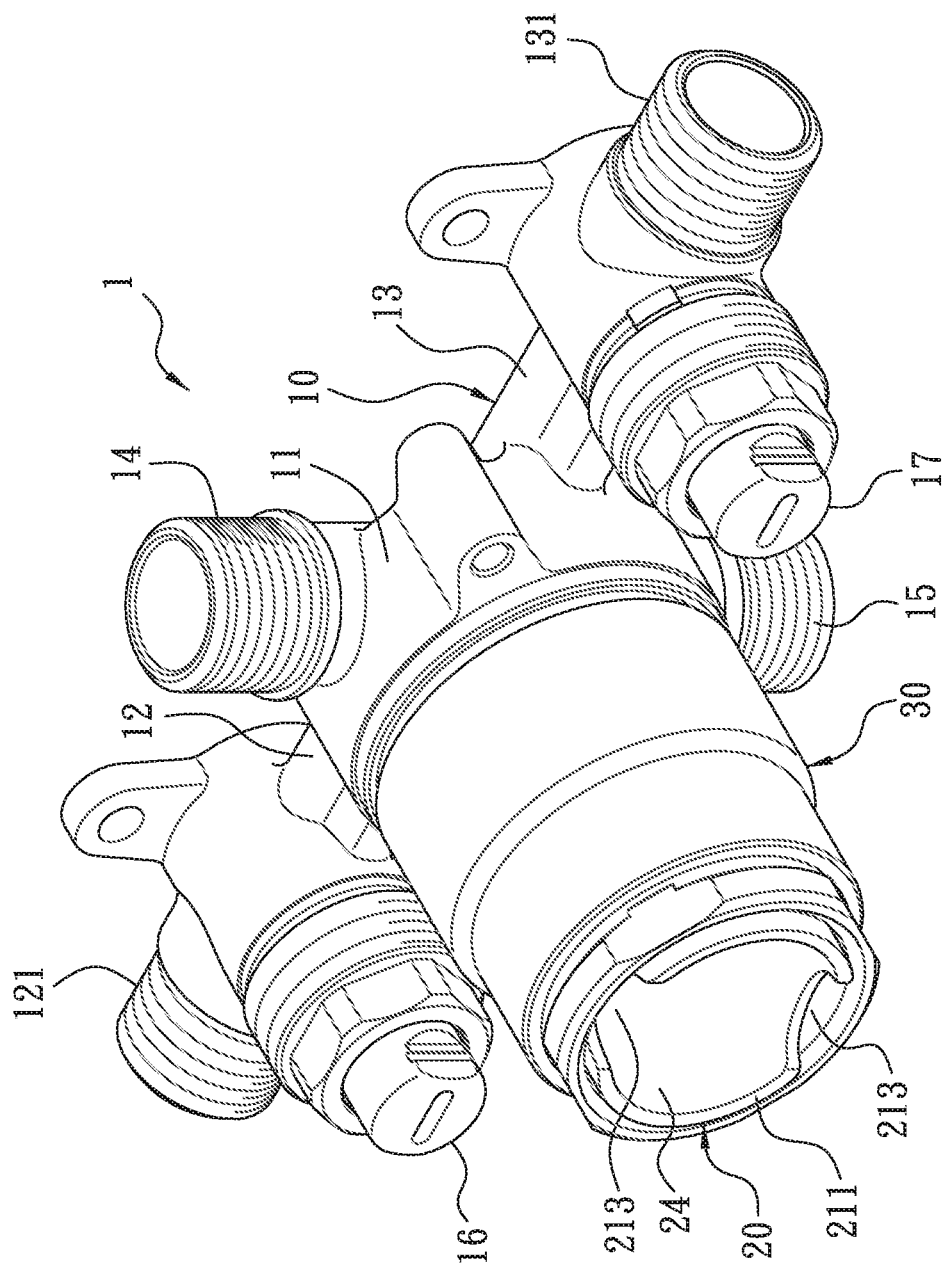
FIG. 1 is a perspective view showing the assembly of a valve assembly according to a preferred embodiment of the present invention.
Figure 2:
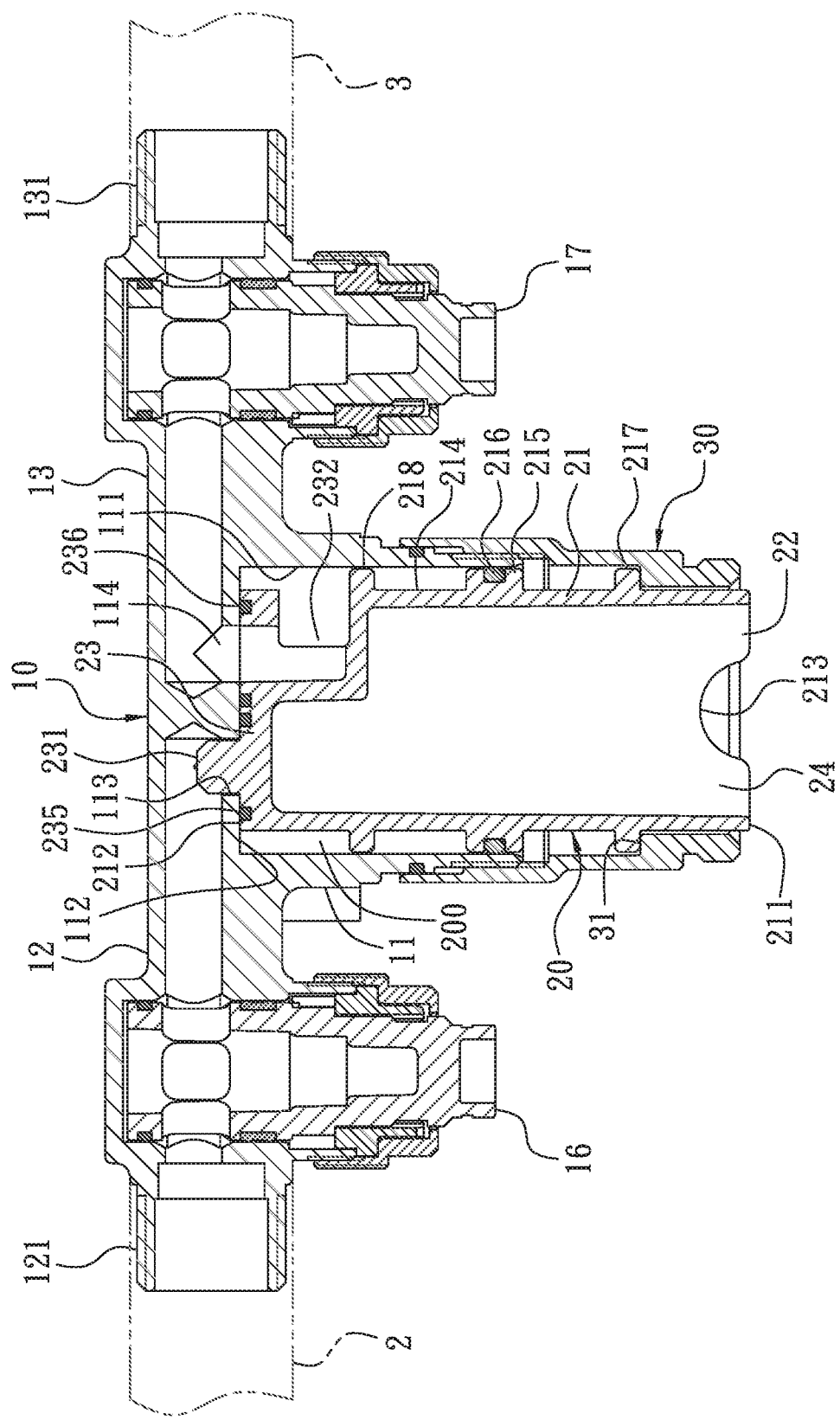
FIG. 2 is a cross sectional view showing the application of a part of the valve assembly according to the preferred embodiment of the present invention.
Figure 3:
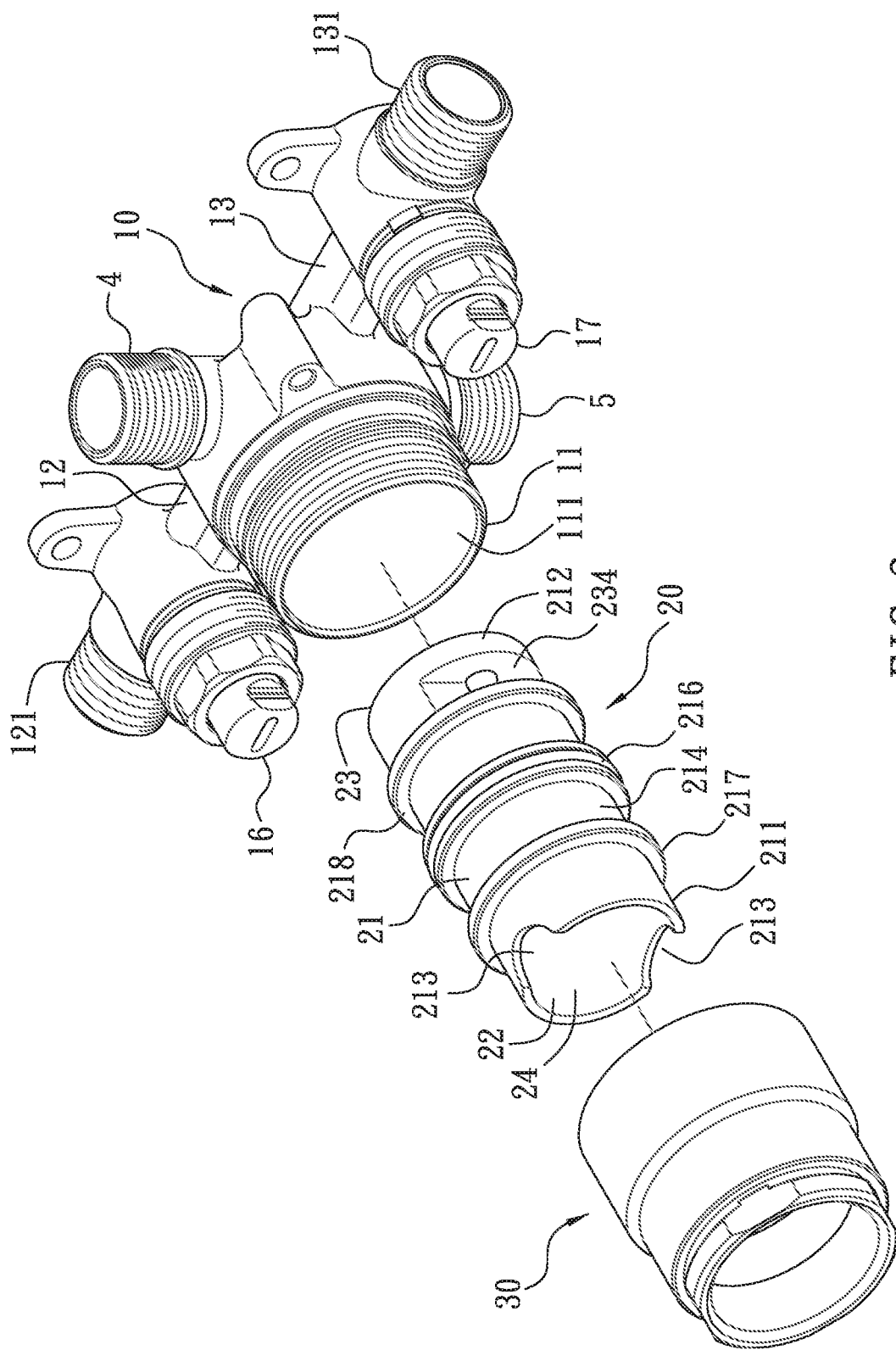
FIG. 3 is a perspective view showing the exploded components of a part of the valve assembly according to the preferred embodiment of the present invention.

With reference to FIGS. 1-3, a connection structure for a test cylinder of a valve assembly 1 according to a preferred embodiment of the present invention comprises: a body 10 and the test cylinder 20.

Figure 4:
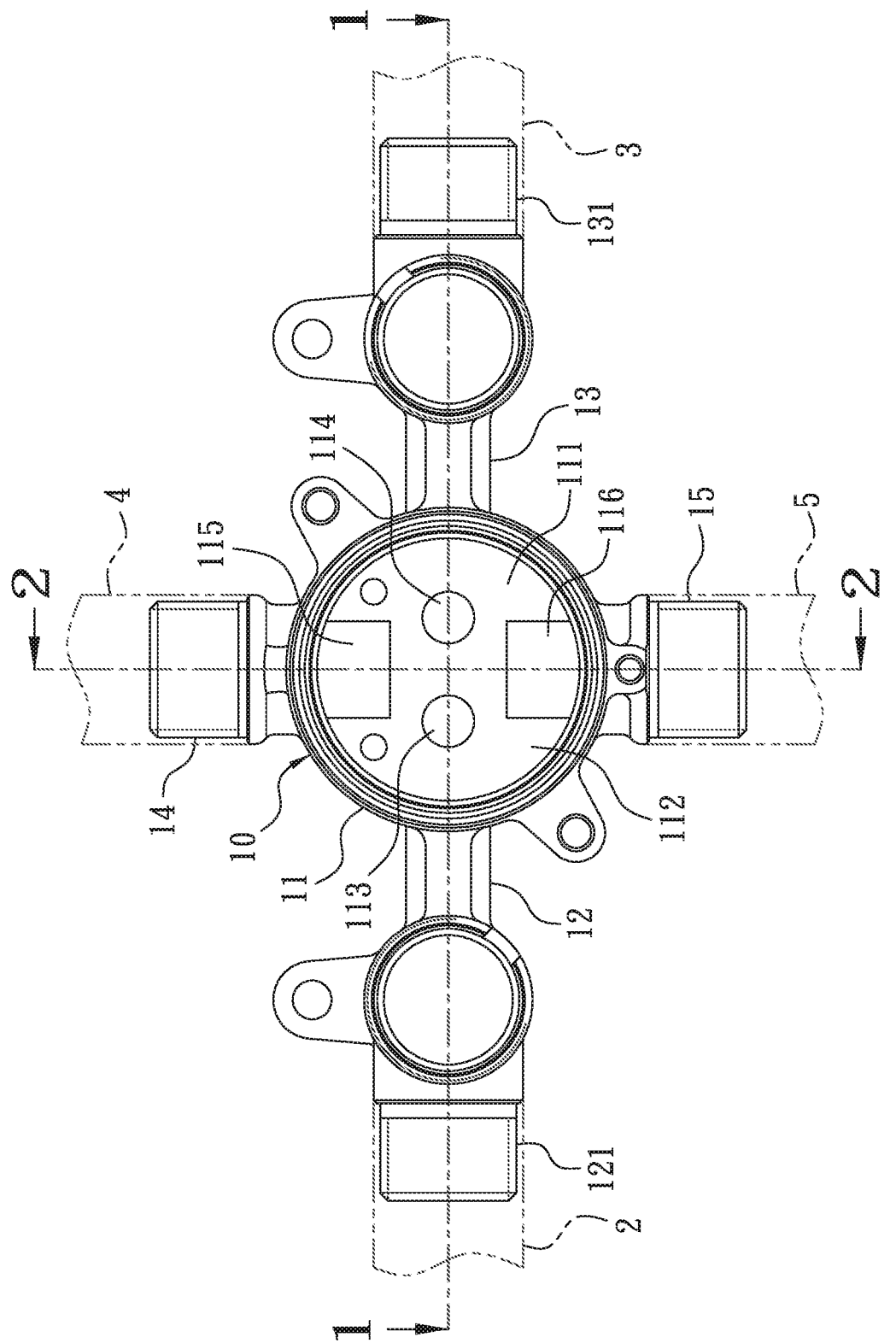
FIG. 4 is a front elevational view showing the exploded components of a body of the valve assembly according to the preferred embodiment of the present invention.
Figure 5:
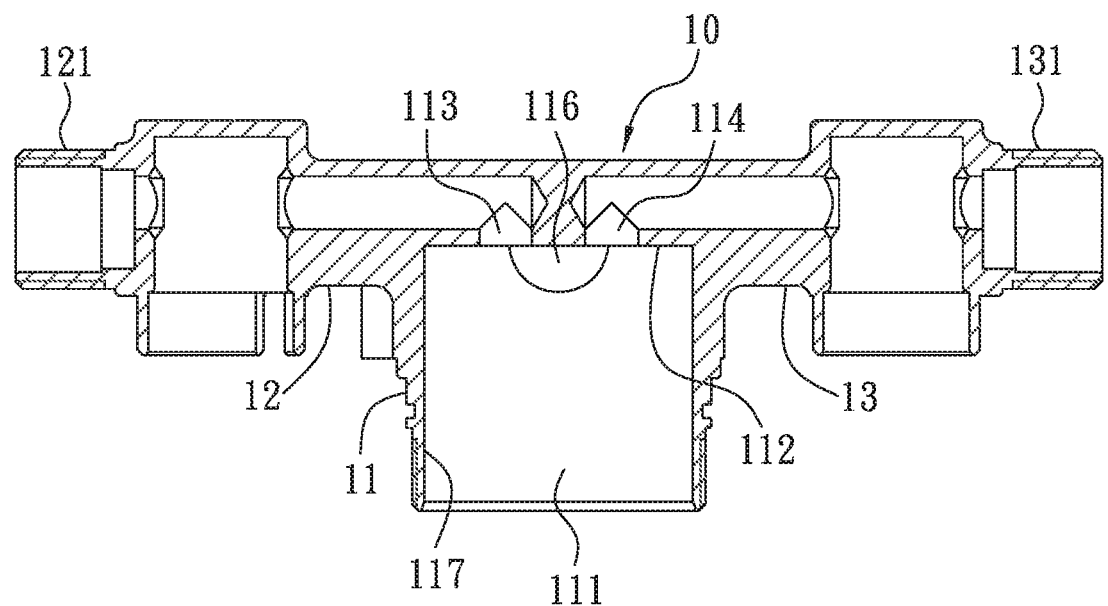
FIG. 5 is a cross sectional view taken along the line 1-1 of FIG. 4.
Figure 6:
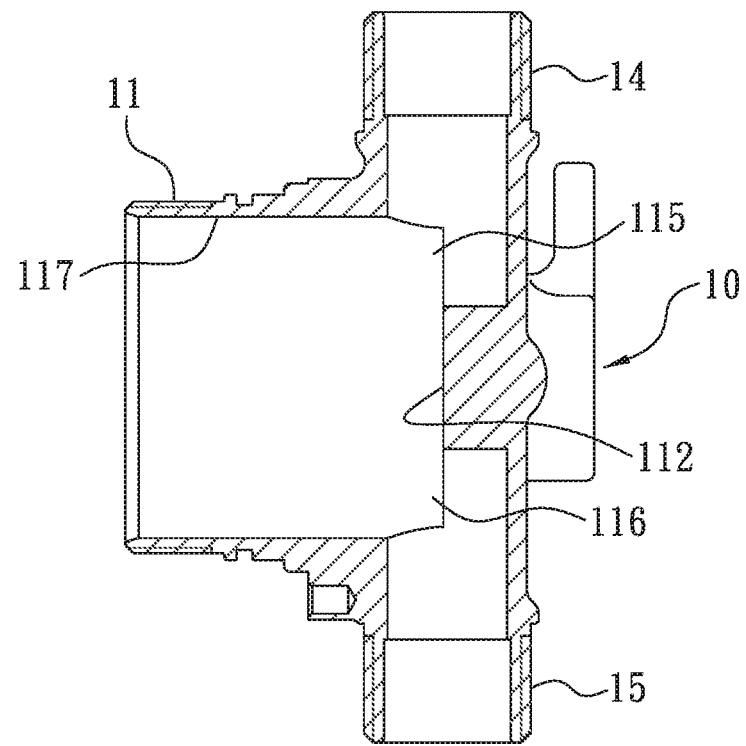
FIG. 6 is a cross sectional view taken along the line 2-2 of FIG. 4.

Referring to FIGS. 4-6, the body 10 includes a holder 11, and the holder 11 has an accommodation chamber 111, a bottom fence 112 formed in the accommodation chamber 111, and a cold-water inlet 113 and a hot-water inlet 114 which are symmetrically defined on the bottom fence 112 and respectively communicate with a cold-water inflow pipe 2 and a hot-water inflow pipe 3 of the body 10; the accommodation chamber 111 has a first mixing-water outlet 115 and a second mixing-water outlet 116 which are symmetrically arranged on a bottom of the accommodation chamber 111 and individually communicate with a first outflow pipe 4 and a second outflow pipe 5.

Figure 7:
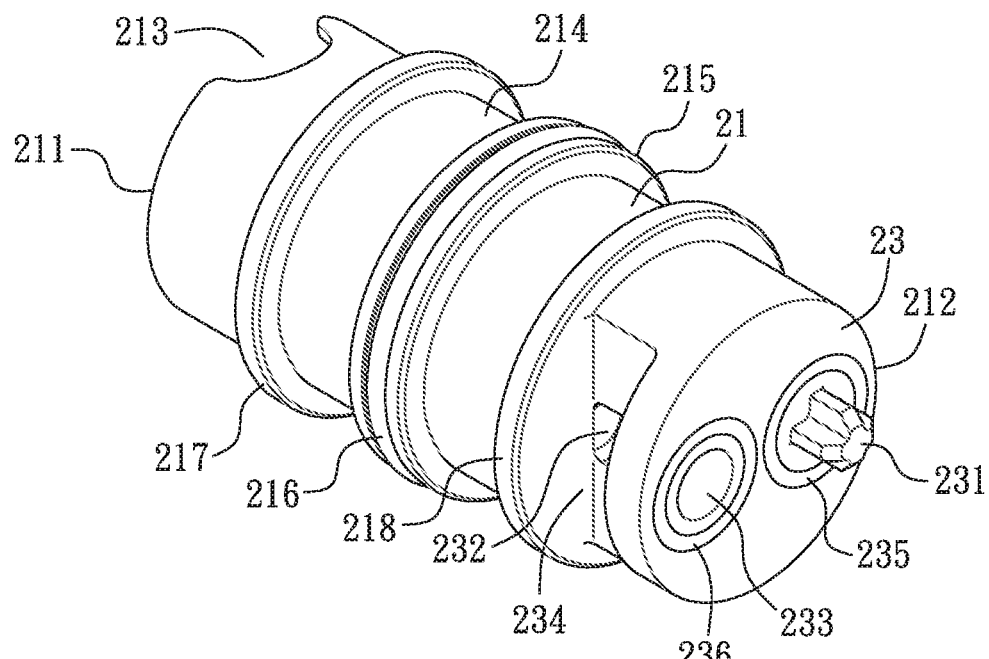
FIG. 7 is a perspective view showing the assembly of a test cylinder of the valve assembly according to the preferred embodiment of the present invention.
Figure 8:
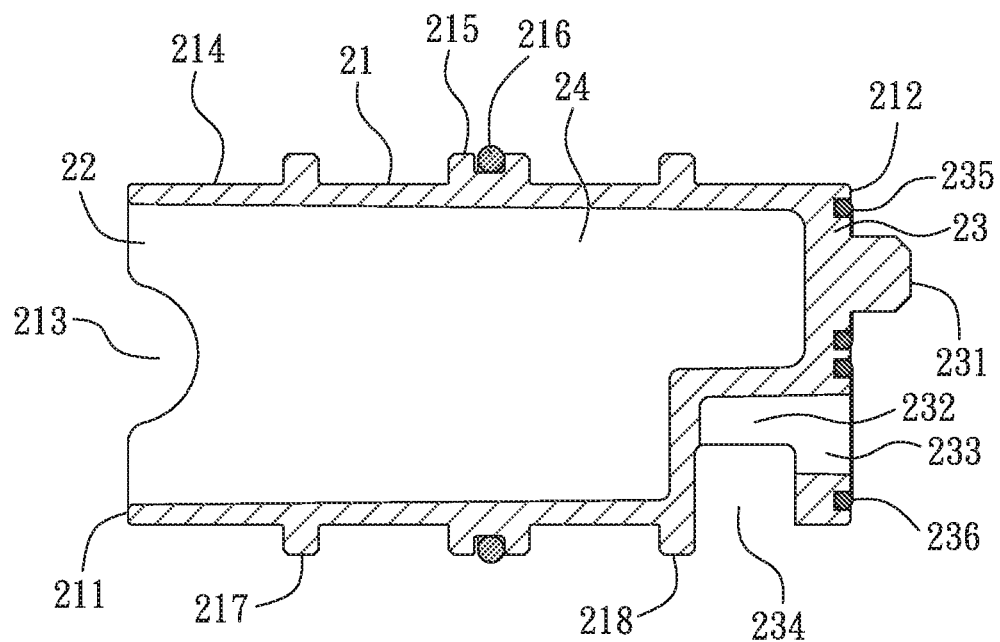
FIG. 8 is a cross sectional view showing the assembly of the test cylinder of the valve assembly according to the preferred embodiment of the present invention.
Figure 9:
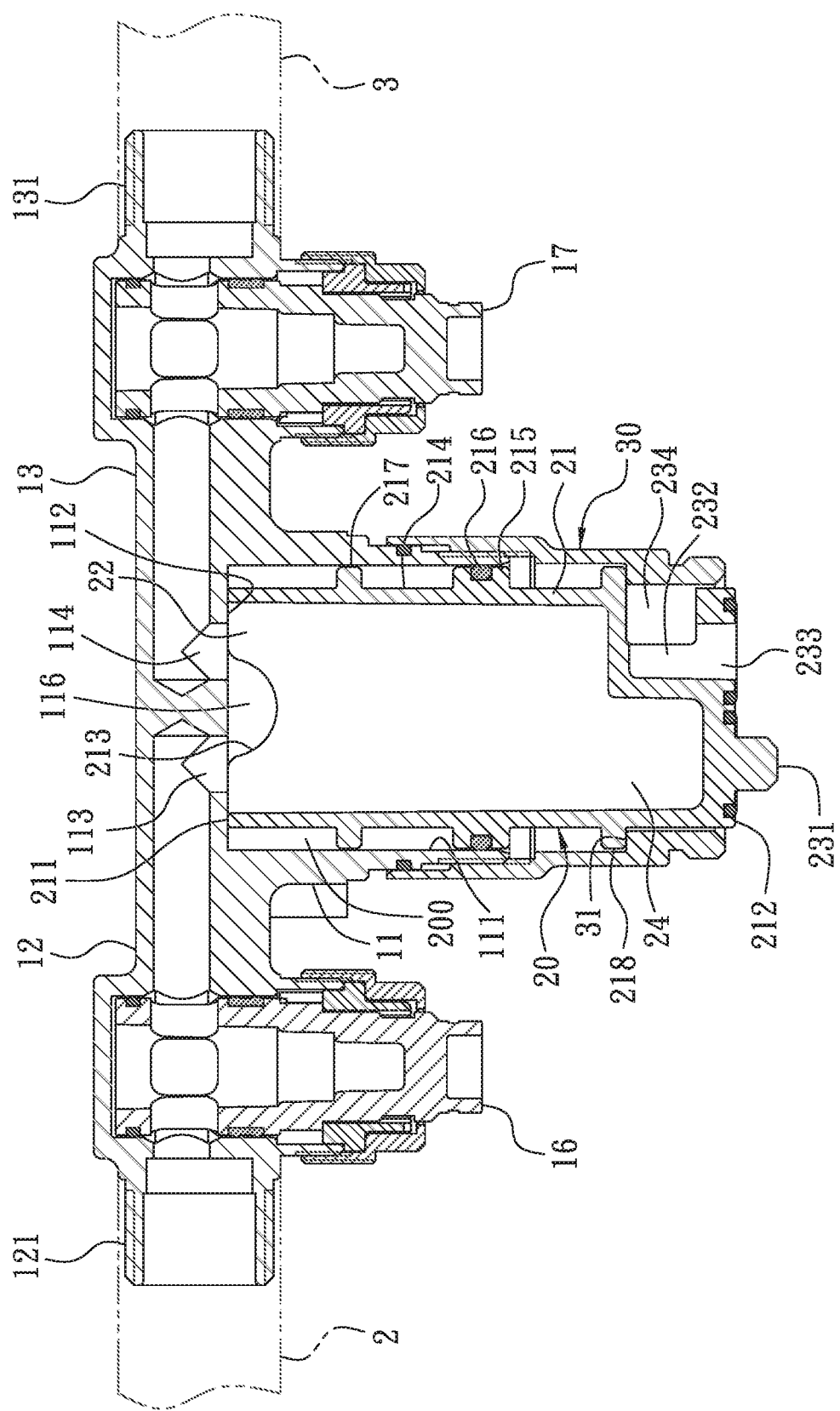
FIG. 9 is another cross sectional view showing the application of a part of the valve assembly according to the preferred embodiment of the present invention.

As shown in FIGS. 7 and 8, the test cylinder 20 includes a peripheral fence 21, a first orifice 22 formed on a first segment 211 of the peripheral fence 21, and an edge fence 23 closing a second segment 212 of the peripheral fence 21; a first cavity 24 defined between the peripheral fence 21 and the edge fence 23 and communicating with the first orifice 22, wherein the peripheral fence 21 has at least one second orifice 213 formed thereon proximate to the first orifice 22, a second cavity 200 defined between an external surround portion 214 of the first segment 211 and an internal surround portion 117 of the accommodation chamber 111 and communicating with the at least one second orifice 213, the first mixing-water outlet 115, and the second mixing-water outlet 116, as illustrated in FIG. 2. In a first fixing direction, the first segment 211 of the test cylinder 20 is engaged in the accommodation chamber 111, as illustrated in FIG. 9, such that the accommodation chamber 111 is closed, the cold-water inlet 113 and the hot-water inlet 114 communicate with each other by way of the first orifice 22 and the first cavity 24, and the first mixing-water outlet 115 and the second mixing-water outlet 116 are in communication with each other by using the at least one second orifice 213 and the second cavity 200 so that the cold-water inflow pipe 2, the hot-water inflow pipe 3, the first outflow pipe 4, and the second outflow pipe 5 form a first closed pipe system.

Figure 10:
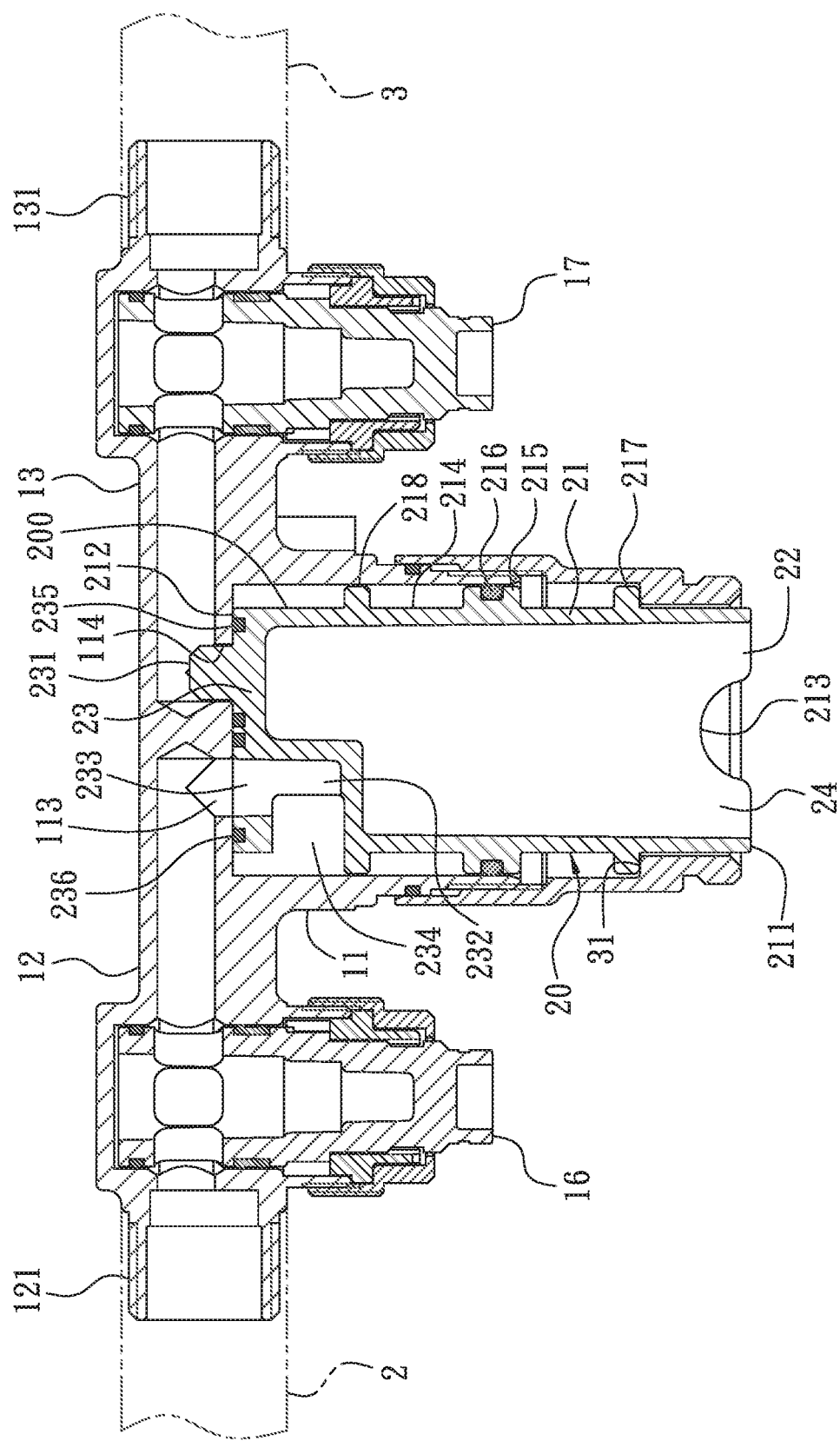
FIG. 10 is also another cross sectional view showing the application of a part of the valve assembly according to the preferred embodiment of the present invention.

The edge fence 23 has a closing portion 231 extending from an outer wall thereof and has a conduit 232 defined in the edge fence 23. In a second fixing direction, the second segment 212 of the test cylinder 20 is engaged in the accommodation chamber 111 or the closing portion 231 matingly engages one of the cold-water inlet 113 and the hot-water inlet 114, as shown in FIGS. 2 and 10, hence the cold-water inlet 113 or the hot-water inlet 114 does not communicate with the accommodation chamber 111 of the body 10, i.e., one of the cold-water inflow pipe 2 and the hot-water inflow pipe 3 forms a second closed pipe system. Alternatively, the other of the cold-water inlet 113 and the hot-water inlet 114 communicates with the first mixing-water outlet 115 and the second mixing-water outlet 116 by way of the conduit 232 and the second cavity 200, i.e., the other of the cold-water inflow pipe 2 and the hot-water inflow pipe 3 forms a third closed pipe system by using the body 10, the first outflow pipe 4, and the second outflow pipe 5.

With reference to FIG. 2, the closing portion 231 matingly engages with the cold-water inlet 113 so that the cold-water inflow pipe 2 forms the second closed pipe system, and the hot-water inflow pipe 3, the first outflow pipe 4 and the second outflow pipe 5 form the third closed pipe system. Referring to FIG. 10, the closing portion 231 matingly engages the hot-water inlet 114 so that the hot-water inflow pipe 3 forms the second closed pipe system, and the cold-water inflow pipe 2, the first outflow pipe 4 and the second outflow pipe 5 form the third closed pipe system.

As shown in FIGS. 1-4, the holder 11 includes a cold-water inflow connector 12 horizontally extending from a first side thereof, a hot-water inflow connector 13 horizontally extending from a second side of the holder 11 opposite to the cold-water inflow connector 12, a first outflow connector 14 vertically extending from a top of the holder 11, and a second outflow connector 15 vertically extending from a bottom of the holder 11 opposite to the first outflow connector 14; the cold-water inflow connector 12 has a cold-water inflow seat 121 configured to connect with the cold-water inflow pipe 2, and the hot-water inflow connector 13 has a hot-water inflow seat 131 configured to connect with the hot-water inflow pipe 3.

With reference to FIGS. 3, 7 and 8, the at least one second orifice 213 of the peripheral fence 21 is defined by at least one cutout formed on an edge of the first orifice 22. In this embodiment, the peripheral fence 21 has two second orifices 213 symmetrically formed on the edge of the first orifice 22. As shown in FIG. 9, when the test cylinder 20 is engaged in the accommodation chamber 111 in the first fixing direction, the at least one second orifice 213 matches with the second cavity 200 so as to communicate the first mixing-water outlet 115 with the second mixing-water outlet 116.

As illustrated in FIGS. 7 and 8, the conduit 232 of the edge fence 23 has a third orifice 233 and a fourth orifice 234 formed thereon; the third orifice 233 communicates with one of the cold-water inlet 113 and the hot-water inlet 114, and the fourth orifice 234 is configured to communicate with the second cavity 200. In addition, the third orifice 233 is perpendicular to the fourth orifice 234.

As illustrated in FIGS. 2 and 10, the edge fence 23 has a first seal washer 235 accommodated in the outer wall thereof around the closing portion 231 and configured to matingly close the bottom fence 112 of the accommodation chamber 111.

As shown in FIGS. 2 and 10, the edge fence 23 also has a second seal washer 236 housed in the outer wall thereof around the third orifice 233 and configured to matingly close the bottom fence 113 of the accommodation chamber 111.

As illustrated in FIGS. 7 and 8, the peripheral fence 21 includes a protruded rib 215 extending from a middle portion of the external surround portion 214 thereof, a third seal washer 216 fitted on the protruded rib 215 so as to matingly engaged with the internal surround portion 117 of the accommodation chamber 111, to close the accommodation chamber 111 and to define the second cavity 200 among the external surround portion 214, the protruded rib 215, and the internal surround portion 117, as shown in FIG. 2. Referring to FIGS. 2, 9 and 10, when the test cylinder 20 is fixed in the first fixing direction or the second fixing direction, the third seal washer 216 matingly engages with the internal surround portion 117 of the accommodation chamber 111.

With reference to FIGS. 1-3, the valve assembly 1 further comprises a locking sleeve 30 configured to fix with the holder 11 of the body 10 so as to force the test cylinder 20 in the accommodation chamber 111. The external surround portion 214 of the peripheral fence 21 of the test cylinder 20 includes a first flange 217 and a second flange 218 respectively extending from two ends of the external surround portion 214 respectively. Referring to FIG. 9, the locking sleeve 30 includes a stepped shoulder 31 formed on an inner wall thereof so that when the test cylinder 20 is mounted in the first fixing direction, the stepped shoulder 31 of the locking sleeve 30 matingly contacts with the second flange 218 so as to fix the test cylinder 20 in the accommodation chamber 111. As shown in FIGS. 2 and 10, when the test cylinder 20 is mounted in the second fixing direction, the stepped shoulder 31 of the locking sleeve 30 matingly contacts with the first flange 217 so as to fix the test cylinder 20 in the accommodation chamber 111.

Thereby, the locking sleeve 30 is applied to fix the test cylinder 20 in the accommodation chamber 111 easily and quickly so that the first seal washer 235 and the second seal washer 236 of the edge fence 23 matingly close the bottom fence 112.

It is to be noted that the first mixing-water outlet 115 is formed on the bottom fence 112, a connection portion of the bottom fence 112 and the internal surround portion 117, and the internal surround portion 117, as shown in FIG. 6. The second mixing-water outlet 116 is formed on the bottom fence 112, the connection portion of the bottom fence 112 and the internal surround portion 117, and the internal surround portion 117. Accordingly, diameters of the first outflow connector 14 and the second outflow connector 15 increase, thus flowing mixing water of cold water and hot water greatly.

As illustrated in FIG. 4, an angle between the bottom fence 113 and the hot-water inlet 114 on the bottom fence 112 of the accommodation chamber 111 is 180 degrees, and an angle between the first mixing-water outlet 115 and the second mixing-water outlet 116 on the accommodation chamber 111 is 180 degrees. Thereby, an angle between any two adjacent of the bottom fence 113, the first mixing-water outlet 115, the hot-water inlet 114, and the second mixing-water outlet 116 is 90 degrees. In other words, the bottom fence 113, the first mixing-water outlet 115, the hot-water inlet 114, and the second mixing-water outlet 116 are isometrically arranged on the accommodation chamber 111, hence an angle between the closing portion 231 and the conduit 232 of the test cylinder 20 is 180 degrees, and the two second orifices 213 are symmetrically formed.

With reference to FIGS. 1-4, the cold-water inflow connector 12 has a first stop valve 16, and the hot-water inflow connector 13 has a second stop set 17, such that the cold water and the hot water respectively flowing into the accommodation chamber 111 are controlled so as to flow or stop flowing. Preferably, the first stop valve 16 and the second stop valve 17 are replaceable in other manners.

The accommodation chamber 111 of the holder 11 accommodates a mixing valve and a control bar for controlling the mixing valve. Thereby, after the cold water from the cold-water inflow connector 12 and the hot water from the hot-water inflow connector 13 flow into the holder 11, they are controlled by the mixing valve and the control bar so as to flow into the first outflow connector 14 and the second outflow connector 15 at a predetermined flow and a predetermined temperature. Furthermore, the mixing valve mates with a pressure balance valve so as to obtain a constant temperature.

The first outflow connector 14 is in connection to a shower via the first outflow pipe 4, and the second outflow connector 15 is coupled to a faucet via and the second outflow pipe 5. The valve assembly 1 further comprises a protective lid and a decoration cover which mate with each other and are mounted on the holder 11. The mixing valve, the control bar, the shower, the faucet, the protective lid, and the decoration cover are well-known art, so further remarks are omitted.

After connecting the cold-water inflow pipe 2, the hot-water inflow pipe 3, the outflow pipe 4, the second outflow pipe 5 and the valve assembly 1, a pressure test is executed so as to confirm whether water leakage occurs in the cold-water inflow pipe 2, the hot-water inflow pipe 3, the outflow pipe 4, the second outflow pipe 5, and the valve assembly 1. For example, the body 10, the locking sleeve 30, and the protective lid are connected, and after executing the pressure test and constructing a wall, the mixing valve, the control bar, and the decoration cover are fixed finally.

As shown in FIG. 9, in the pressure test to the first closed pipe system, the test cylinder 20 is fixed on the first fixing direction, wherein the locking sleeve 30 is fixed in the accommodation chamber 111, inlet segments of the cold-water inflow pipe 2, the hot-water inflow pipe 3, the outflow pipe 4, and the second outflow pipe 5 opposite to the valve assembly 1 are closed by at least one plug and at least one seal cap. At least one pressure gauge configured to detect a water pressure is fixed on the inlet segments of the cold-water inflow pipe 2, the hot-water inflow pipe 3, the outflow pipe 4, and the second outflow pipe 5 or on at least one connection of the cold-water inflow pipe 2, the hot-water inflow pipe 3, the outflow pipe 4, and the second outflow pipe 5.

As illustrated in FIG. 2, when a water pressure decreases in the first closed pipe system (such as the cold-water inflow pipe 2 or the hot-water inflow pipe 3), the locking sleeve 30 is removable, the test cylinder 20 is mounted in the accommodation chamber 111, and a pressure gauge is fixed on the second closed pipe system or the third closed pipe system. Alternatively, two pressure gauges are fixed on the closed second pipe system or the third closed pipe system respectively.

When the pressure test to the second closed pipe system is executed, a water leakage of the cold-water inflow pipe 2 or the hot-water inflow pipe 3 is checked. Preferably, it is efficient when pressure tests to the second and third closed pipe systems are executed simultaneously. For example, when a water pressure of the second closed pipe system decreases and a pressure test to the third closed pipe system is executed, a water leakage of the third closed pipe system is confirmed after a water pressure of the third closed pipe system reduces.

Accordingly, the pressure test(s) of each or all of the first, second, and third closed pipe systems are executed so as to confirm the water leakage(s) of any one of the first, second, and third closed pipe systems quickly and exactly.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A test cylinder of a valve assembly being mounted a body of the valve assembly, the body including a holder, and the holder comprising an accommodation chamber, a bottom fence formed in the accommodation chamber, and a cold-water inlet and a hot-water inlet which are defined on the bottom fence and respectively communicate with a cold-water inflow pipe and a hot-water inflow pipe of the body; the accommodation chamber having a first mixing-water outlet and a second mixing-water outlet which are arranged on a bottom of the accommodation chamber and individually communicate with a first outflow pipe and a second outflow pipe;

the test cylinder including a peripheral fence, a first orifice formed on a first segment of the peripheral fence, and an edge fence closing a second segment of the peripheral fence; a first cavity defined between the peripheral fence and the edge fence and communicating with the first orifice, wherein the peripheral fence has at least one second orifice formed thereon proximate to the first orifice, a second cavity defined between an external surround portion of the first segment and an internal surround portion of the accommodation chamber and communicating with the at least one second orifice, the first mixing-water outlet, and the second mixing-water outlet;

wherein in a first fixing direction, the first segment of the test cylinder is engaged in the accommodation chamber, such that the accommodation chamber is closed, the cold-water inlet and the hot-water inlet communicate with each other by way of the first orifice and the first cavity, and the first mixing-water outlet and the second mixing-water outlet are in communication with each other by using the at least one second orifice and the second cavity so that the cold-water inflow pipe, the hot-water inflow pipe, the first outflow pipe, and the second outflow pipe form a first closed pipe system; the edge fence has a closing portion extending from an outer wall thereof and has a conduit defined in the edge fence; in a second fixing direction, the second segment of the test cylinder is engaged in the accommodation chamber or the closing portion matingly engages one of the cold-water inlet and hot-water inlet, hence the cold-water inlet or the hot-water inlet does not communicate with the accommodation chamber of the body so that one of the cold-water inflow pipe and the hot-water inflow pipe forms a second closed pipe system; the other of the cold-water inlet and the hot-water inlet communicates with the first mixing-water outlet and the second mixing-water outlet by way of the conduit and the second cavity so that the other of the cold-water inflow pipe and the hot-water inflow pipe forms a third closed pipe system by using the body, the first outflow pipe, and the second outflow pipe.

2. The test cylinder of the valve assembly as claimed in claim 1, wherein the at least one second orifice of the peripheral fence is defined by at least one cutout formed on an edge of the first orifice.

3. The test cylinder of the valve assembly as claimed in claim 2, wherein the peripheral fence has two second orifices symmetrically formed on the edge of the first orifice.

4. The test cylinder of the valve assembly as claimed in claim 1, wherein the conduit of the edge fence has a third orifice and a fourth orifice formed thereon; the third orifice communicates with one of the cold-water inlet and the hot-water inlet, and the fourth orifice is configured to communicate with the second cavity.

5. The test cylinder of the valve assembly as claimed in claim 4, wherein the third orifice is perpendicular to the fourth orifice.

6. The test cylinder of the valve assembly as claimed in claim 1, wherein the edge fence has a first seal washer accommodated in the outer wall thereof around the closing portion and configured to matingly close the bottom fence of the accommodation chamber.

7. The test cylinder of the valve assembly as claimed in claim 4, wherein the edge fence also has a second seal washer housed in the outer wall thereof around the third orifice and configured to matingly close the bottom fence of the accommodation chamber.

8. The test cylinder of the valve assembly as claimed in claim 1, wherein the peripheral fence includes a protruded rib extending from a middle portion of the external surround portion thereof, a third seal washer fitted on the protruded rib so as to matingly engaged with the internal surround portion of the accommodation chamber, to close the accommodation chamber and to define the second cavity among the external surround portion, the protruded rib, and the internal surround portion.

9. The test cylinder of the valve assembly as claimed in claim 1, wherein the external surround portion of the peripheral fence of the test cylinder includes a first flange and a second flange respectively extending from two ends of the external surround portion respectively; when the test cylinder is mounted in the second fixing direction, the stepped shoulder of the locking sleeve matingly contacts with the first flange so as to fix the test cylinder in the accommodation chamber.

10. The test cylinder of the valve assembly as claimed in claim 1, wherein an angle between the bottom fence and the hot-water inlet on the bottom fence of the accommodation chamber is 180 degrees, and an angle between the first mixing-water outlet and the second mixing-water outlet on the accommodation chamber is 180 degrees; an angle between any two adjacent of the bottom fence, the first mixing-water outlet, the hot-water inlet, and the second mixing-water outlet is 90 degrees.

* * * * *